July 7, 1936.    C. L. STURGIS    2,046,536
SHOE LAST
Filed Nov. 1, 1934
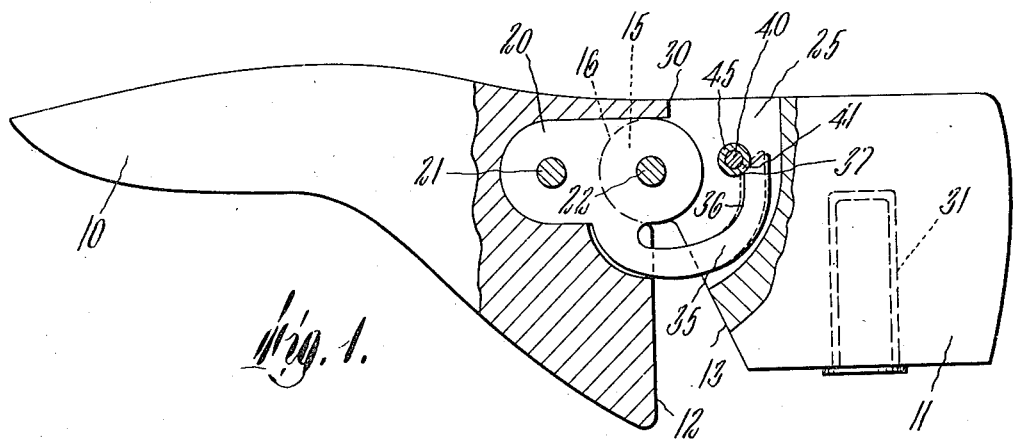
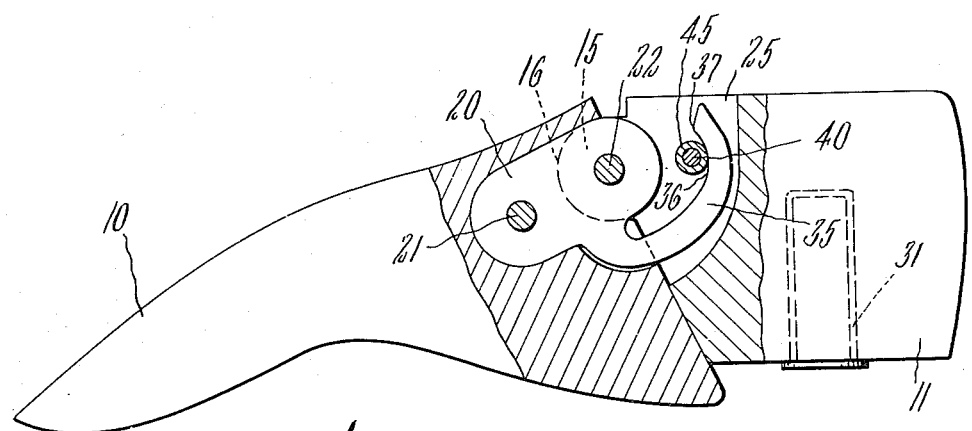
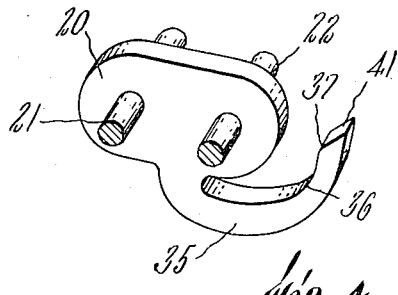
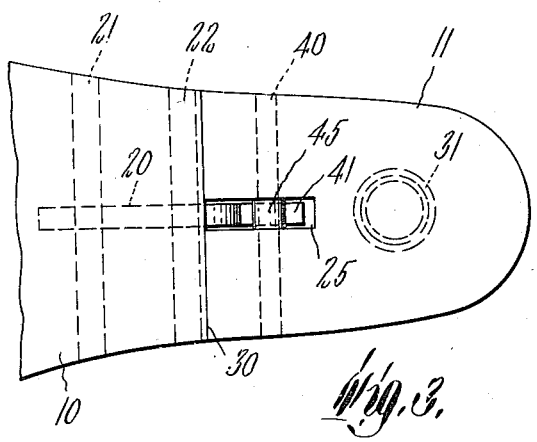
Inventor
Carl L. Sturgis
by Wright, Brown, Quinby May
Attys.

Patented July 7, 1936

2,046,536

UNITED STATES PATENT OFFICE 2,046,536

SHOE LAST

Carl L. Sturgis, East Bridgewater, Mass.

Application November 1, 1934, Serial No. 750,938

5 Claims. (Cl. 12—136)

This invention relates to shoe lasts on which shoes are built. As in most cases the shoe is formed snugly against the surface of the last and is nearly completed when ready to be removed from the last, it is necessary that the last be "broken" to permit the removal of the shoe therefrom without injury to the shoe. To this end, lasts are customarily made of two members hinged together in such a way that the overall length of the last can be reduced by "breaking" the last. When the last is in use, it is desirable that the two parts be firmly maintained in their normal relative position so as to yield therefrom only upon the application of considerable force in order to avoid injury to the insole by pinching between the two parts of the last. It is an object of the present invention to provide an articulated last with improved hinge mechanism which is relatively simple and cheap but which is highly effective in holding the last members firmly in their normal position until the last is "broken" by the application of considerable force. It is a further object of the invention to improve the last by providing hinge mechanism which occupies relatively little space and which thus necessitates the cutting away of a relatively small amount of wood from the members of the last, reducing the liability of breakage.

Other advantageous features will be apparent to one skilled in the art from the disclosure of the invention in the following description of an embodiment thereof and in the drawing, of which Figure 1 is an elevation of a shoe last embodying the invention, a portion being broken away to show the hinge parts.

Figure 2 is a view similar to Figure 1 showing the last in its "broken" position.

Figure 3 is a fragmentary plan view of the last shown in Figures 1 and 2.

Figure 4 is a perspective view of the hinge member with anchoring pins and cam element for holding the last in its normal position.

The last illustrated on the drawing may comprise two members 10 and 11 which are hinged together and which are shaped to determine the form of a shoe built thereon. The last members have confronting faces 12, 13, respectively, which are inclined with respect to each other, as shown in Figure 1, when the last is in its normal position for use, but which abut each other as shown in Figure 2 when the last is "broken". The abutting portion of the last members 10 and 11 may be formed in such a manner as to provide a socket joint between the members, the heel member 11 having a semi-cylindrical projection 15 which fits into a semi-cylindrical recess 16 in the member 10. According to the invention, a simple but effective hinge device is provided, this comprising an elongated plate 20 having a pair of perforations therein to receive a pair of pins 21 and 22. The toe member 10 of the last is provided with a suitable slot to receive an end portion of the hinge plate 20, the plate being fitted in the slot and anchored therein by the pin 21 so that it is fixed with respect to the toe member 10 and rocks therewith. The heel member 11 is also slotted as at 25 to receive the opposite end of the plate 20. The pin 22 which passes through this end portion of the plate 20 is embedded in the semi-cylindrical portion 15 of the heel member 11 so as to be coaxial therewith. Thus the pin 22 is the hinge pin about which the member 10 rocks with respect to the member 11. Since, as indicated in Figure 4, the plate 20 may be relatively flat and thin if made of strong material such as steel, only a small amount of wood need be cut away from the members 10 and 11 to form the slots to receive the plate 20.

When a shoe is built on the last, the insole of the shoe lies directly against the sole surface of the last. This surface is transversely intersected by the line of separation 30 between the members 10 and 11. If the two last members 10 and 11 rock slightly from their normal relative position, the line 30 will open up as a crack in which the insole of the shoe is liable to be pinched, thus forming an undesirable ridge across the insole in the finished shoe. It is highly important, as a practical matter, that the two members of the last be firmly maintained in their normal position for use while the shoe is being built thereon. During the building of a shoe on a last, the last is supported on a post or standard which extends into a hole 31 in the heel member 11. When the last is thus supported, the toe portion 10 may be subjected to various stresses, as from blows from a hammer, tending to open momentarily the line of division 30 between the members. To avoid such opening, the portions of the members 10 and 11 abutting at the line 30 must be pressed together strongly. According to the invention, the last is provided with mechanism by which a large force is opposed to initial movement of its members from their normal relative position. To this end, the toe member 10 may be provided with a cam element projecting therefrom into the heel member 11 to cooperate with a pin or lug fixed in the latter member. As shown in Figures 1 and 2, the cam member 35 may conveniently be integral with the plate 20 and may be in the form of a curved horn projecting laterally from the plate 20 and extending into the slot 25 of the heel member 11. The inner edge 36 of the cam element 35 is preferably curved with the axis of the hinge pin 22 as the approximate center of curvature. The shape of the curve of the edge 36 is modified so that it has a point 37 which is nearer to the axis of the pin 22 than the edge portions on either side of this point. The lug 40 is fixed in the slot 25 so as to ride on the cam edge 36, the lug being positioned, as shown in Figure 1, so that, when the last is in its normal position for use, the lug 40 is just beyond the high point 37 of the cam edge and rests against a portion 41 of the cam edge which diverges sharply from the general curvature of the edge 36. The shape of the cam element 35 is such that, when the lug 40 engages the cam edge thereof at points adjacent to the high point 37, the cam element 35 is distorted from its normal shape as indicated by the dotted outline in Figure 1, the maximum distortion occurring when the lug 40 passes the point 37, thus producing a snap-action. Since the cam element 35 is preferably of heavy stiff metal, it opposes a strong restoring force to such distortion. The force opposing initial opening movement between the members 10 and 11 thus depends upon the stiffness of the cam element 35 and also upon the angle of pitch of the surface portion 41. Thus a force of any desired magnitude opposing the initial opening movement of the last can be readily obtained by the choice of material and shape of the member 35.

In the embodiment of the invention illustrated on the drawing, the cam member 35 engages on the side of the lug 40 which is remote from the hinge pin 22. It is thus evident that, since the end portion of the member 35 is displaced in a direction away from the hinge axis, the lug 40 presses the entire hinge member 20 and the last member 10 toward the heel end of the last. Thus the lug 40 assists the hinge pin 22 in holding the members 10 and 11 together, and thus reinforces the joint between the last members.

In order to avoid undue wear on the cam surfaces 41 and 36 and also on the lug 40, the lug may be provided with a cylindrical sleeve 45 which turns freely thereon and is engaged by the cam element 35.

It is evident that various modifications and changes may be made in the details of structure of the embodiment of the invention herein shown and described without departing from the spirit or scope thereof as defined in the following claims.

I claim:—

1. A hinged shoe last comprising a pair of relatively rockable members having confronting faces with slots therein, hinge mechanism connecting said members, said mechanism comprising a flat plate projecting in the slot in one said member and secured therein against movement relative to said one member, said plate also having a portion projecting into the slot in the other said member and pivotally secured therein, and means yieldingly maintaining said members in normal relative position for use, said means comprising a fixed lug in the slot of said other member and a spring cam member projecting from said plate and engaging said fixed lug.

2. A hinged shoe last comprising a pair of relatively rockable members, and means for pivotally connecting said members together and yieldingly maintaining the members in normal relative position for use, and means comprising an elongated plate having one end portion projecting edgewise into one of said members and secured therein to rock therewith, the other end portion of said plate projecting edgewise into the other said member and pivotally secured therein, a fixed lug mounted in said other member, and a resilient cam element secured to said one member and projecting into said other member to engage said lug, said cam element and lug being arranged so that said element is distorted by initial rocking movement of said members from their normal relative position for use.

3. A hinged shoe last comprising a pair of relatively rockable members, and means for pivotally connecting said members together and yieldingly maintaining the members in their normal relative position for use, said means comprising an elongated flat plate having a hook-shaped horn projecting from a side edge thereof and extending beyond an end thereof, said plate having a pair of perforations near the ends thereof, a pivot pin extending through one of said perforations and embedded in one of said members, an anchoring pin extending through the other perforation and embedded in the other said member to secure said plate to said other member for movement therewith, and a fixed lug mounted in said one member and engaged by the inner edge of said hook-shaped horn adjacent to the end thereof whereby said lug moves along a portion of said inner edge when said members are rocked, the engaged portion of said inner edge having an intermediate point nearer to the axis of said pivot than the remainder of said edge portion.

4. A hinged shoe last comprising a pair of relatively rockable members, hinge mechanism connecting said members, and means for yieldingly maintaining said members in their normal relative position for use, said means comprising a lug fixed in one said member and a hook-shaped resilient element anchored in the other said member and projecting therefrom beyond said lug to hook thereover.

5. A hinged shoe last comprising a pair of relatively rockable members, hinge mechanism connecting said members, and means for yieldingly maintaining said members in their normal relative position for use, said means comprising a lug fixed to one member and a cooperating element projecting from the other member, said element having a camming engagement with the remote side of the lug whereby said element and lug tend to prevent bodily separation of said members.

CARL L. STURGIS.